United States Patent [19]
Osborne

[11] Patent Number: 5,951,857
[45] Date of Patent: Sep. 14, 1999

[54] FLIGHTLINE RAPID OIL PRESERVATION SYSTEM

[76] Inventor: William Osborne, 2508 Oregon Ct, Suite L3, Torrance, Calif. 90506

[21] Appl. No.: 08/953,954

[22] Filed: Oct. 10, 1997

[51] Int. Cl.⁶ .......................... B01D 36/00; B01D 29/33; B01D 29/52
[52] U.S. Cl. .................. 210/168; 210/196; 210/241; 210/257.1; 210/416.5; 210/416.1; 210/167; 244/114 R
[58] Field of Search ................. 210/241, 257.1, 210/167, 168, 172, 805, 767, 196, 416.5, 416.1; 244/114 R

[56] References Cited

U.S. PATENT DOCUMENTS 3,394,812 7/1968 Cohen .
3,954,611 5/1976 Reedy .

Primary Examiner—Thomas M. Lithgow
Attorney, Agent, or Firm—Arthur Freilich; Robert Hornbaker; Leon Rosen

[57] ABSTRACT

A system is provided for changing hydraulic oil in vehicles such as airplanes, which enables rapid replacement of dirty oil and rapid cleaning of oil to meet military/commercial aircraft specifications for reuse. The apparatus includes a frame (40), dirty and clean oil tanks (14, 16) mounted on the frame, a filter tank (30) with filters (32) mounted on the frame, and pump and valve means (20) for controlling the flow of oil. Initially, the apparatus is rolled up to an airplane, dirty oil in the hydraulic reservoir of the plane is pumped into the dirty oil tank, and clean oil from the clean oil tank is pumped into the airplane reservoir. Thereafter, while the apparatus is moved or is stationary, dirty oil from the dirty oil tank is pumped through filters of the filter tank and into the clean oil tank for an initial cleaning, and thereafter the oil is continually circulated from the clean oil tank through the filtered tank and back to the clean oil tank to polish the oil. The filter tank includes a filter region divider (64) that divides the filters into two groups (90, 92), a manifold divider (66), and a series conduit (84) that connects the first manifold region part (74) to the second filter region part (72).

2 Claims, 3 Drawing Sheets

PUMP TO
DIRTY OIL TANK

PUMP FROM
CLEAN OIL TANK

INITIAL OIL
CLEANING

POLISHING OIL

FLIGHTLINE RAPID OIL PRESERVATION SYSTEM

BACKGROUND OF THE INVENTION

Vehicles such as commercial and military airplanes, often have large reservoirs of hydraulic fluid, wherein the hydraulic fluid or oil must be changed at intervals. In practice, a pump is used to pump out the dirty oil into a container, and one or more containers of new oil are opened and poured into the reservoir. The dirty oil is accumulated in drums, and later pumped into tanker trucks that take away the oil for reprocessing. The repeated handling of the used oil and the need to continually purchase and store new oil, makes the replacement of hydraulic oil expensive and time consuming. An apparatus that more efficiently handled the oil, would be of value.

SUMMARY OF THE INVENTION

In accordance with one embodiment of the present invention, an apparatus is provided for rapidly and effectively replacing oil. The apparatus includes a frame, dirty and clean oil tanks mounted on the frame, a filter tank containing filters and mounted on the frame, and pump and valve means mounted on the frame for flowing oil through the apparatus. The pump and valve means is constructed so dirty oil from a vehicle reservoir can be initially pumped into the dirty oil tank, and then oil from the clean oil tank can be pumped into the vehicle reservoir to refill it. Thereafter, oil in the dirty oil tank is cleaned by initially pumping it through the filter tank and its filters to the clean oil tank to initially clean the oil, and thereafter pumping oil from the clean oil tank through the pressure vessel and its filters and back to the clean oil tank to polish the oil. When the oil in the clean oil tank is sufficiently polished, then the apparatus is ready to be rolled to another vehicle to replace its oil. The dirty and clean oil tanks therefore serve several purposes, in taking dirty oil from the vehicle, supplying clean oil to the vehicle, and providing tanks used in cleaning and then polishing the oil.

An auxiliary tank may be provided to enable emptying of the clean oil tank for the oil polishing operation.

The pressure vessel has a filter region divided into two parts, with a plurality of disposable filters in each filter region part. The oil is passed through filters in one filter region part, and then through filters in the second filter region part, to clean the oil and assure that any filter breakdown will not result in greatly contaminating the oil. The tank includes two manifold region parts, the first collecting oil from the first group of filters and transferring it to the second filter region part, and the second manifold region part collecting oil from the second group of filters for storage or further processing.

The novel features of the invention are set forth with particularity in the appended claims. The invention will be best understood from the following description when read in conjunction with the accompanying drawings.

DESCRIPTION OF THE PREFERRED EMBODIMENT

Figure 1:
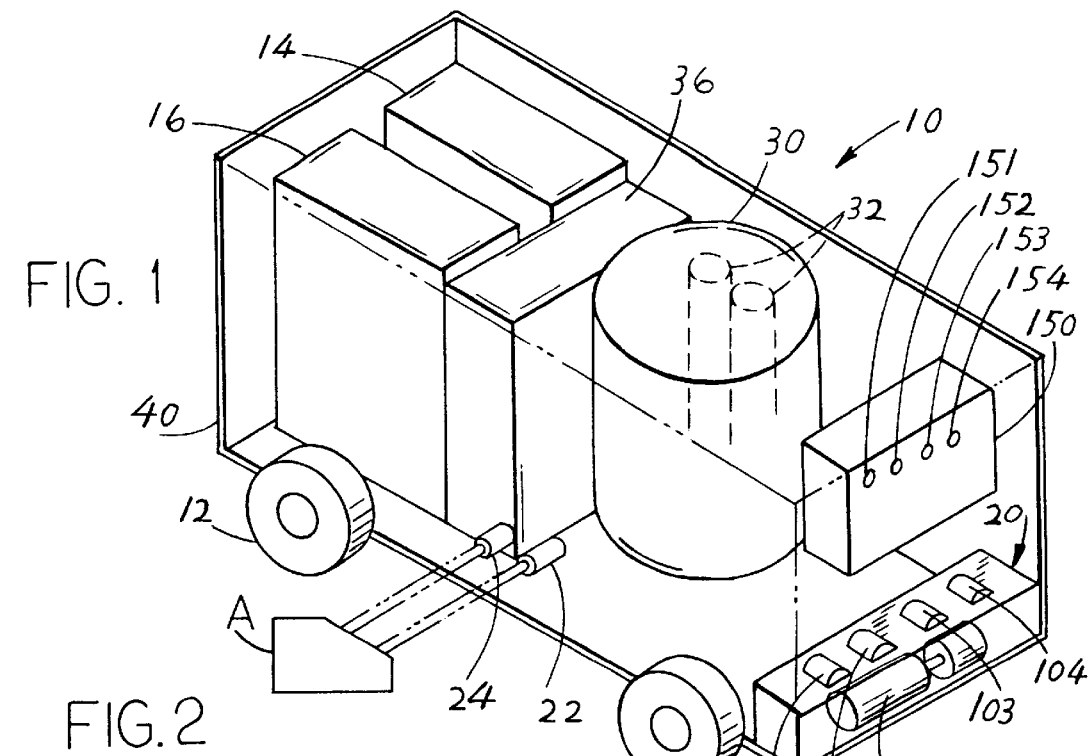
FIG. 1 is an isometric view of apparatus constructed in accordance with the present invention for efficiently handling hydraulic oil.

FIG. 1 illustrates an apparatus 10 for use at an airport flightline, for providing clean hydraulic oil for airplanes. Larger airplanes such as large military transports, have hydraulic oil reservoirs containing about 60 gallons of oil, while moderate size airplanes may have hydraulic oil reservoirs containing about 10 gallons of hydraulic oil. The apparatus has wheels 12 that enable it to be driven or towed to the airplane for a rapid oil change. The apparatus has a dirty oil tank 14 with sufficient capacity such as 70 gallons, and a clean oil tank 16 of similar capacity. A pump and valve arrangement or means 20 is used to pump oil in through a system input 22 that may include a hose for reaching to the vehicle reservoir, and a system output 24 that also may include a hose. The apparatus also includes a filter tank 30 with several disposable filters 32 therein for cleaning oil. It usually takes hours to clean oil, so the dirty oil tank 14 is initially kept empty while the clean oil tank 16 is initially kept full of clean oil. When the apparatus is wheeled up to an airplane A or other vehicle and hoses from the input and output 22, 24, have their ends dropped into the airplane oil reservoir, the pump means 20 is operated to initially pump out all of the dirty oil from the airplane reservoir into the dirty oil tank 14. When substantially all of the oil has been removed, the pump means 20 is switched to pump clean oil from the clean oil tank 16 into the airplane reservoir to refill it. The pump means 20 can pump at a rate of about 10 gallons per minute, so even for the largest airplane, it takes only about twelve minutes to pump out the dirty oil and pump in clean oil. Thereafter, the apparatus 10 is moved away from the airplane and the hydraulic oil system in the airplane is ready for use.

Soon after sufficient clean oil has been pumped from the tank 16 to the airplane, the apparatus is ready to clean the dirty oil in the dirty oil tank 14. If not all of the clean oil has been pumped out of the clean oil tank, it is pumped into an auxiliary clean oil tank 36. It requires about an hour to clean the dirty oil to minimum standards, and further time to continually "polish" the oil to even higher standards. Substantial time is taken during movement of the apparatus 10 from a location adjacent to the airplane to a location away from it and then to a parking area. If the dirty oil had to "sit" in the dirty oil tank while the apparatus was moved and stored around the airport and finally moved to processing equipment, and the dirty oil was then pumped into the processing equipment and later clean oil was pumped into the clean oil tank, considerable time would be spent, as well as work in making fluid connections. Instead, applicant provides storage and cleaning apparatus, all on a frame 40 that is supported on the wheels 12. Accordingly, after several minutes during which dirty oil is received in the dirty oil tank 14 and clean oil is pumped out of the clean oil tank 16, the pump means 20 is operated to begin cleaning of the dirty oil.

Figure 3:
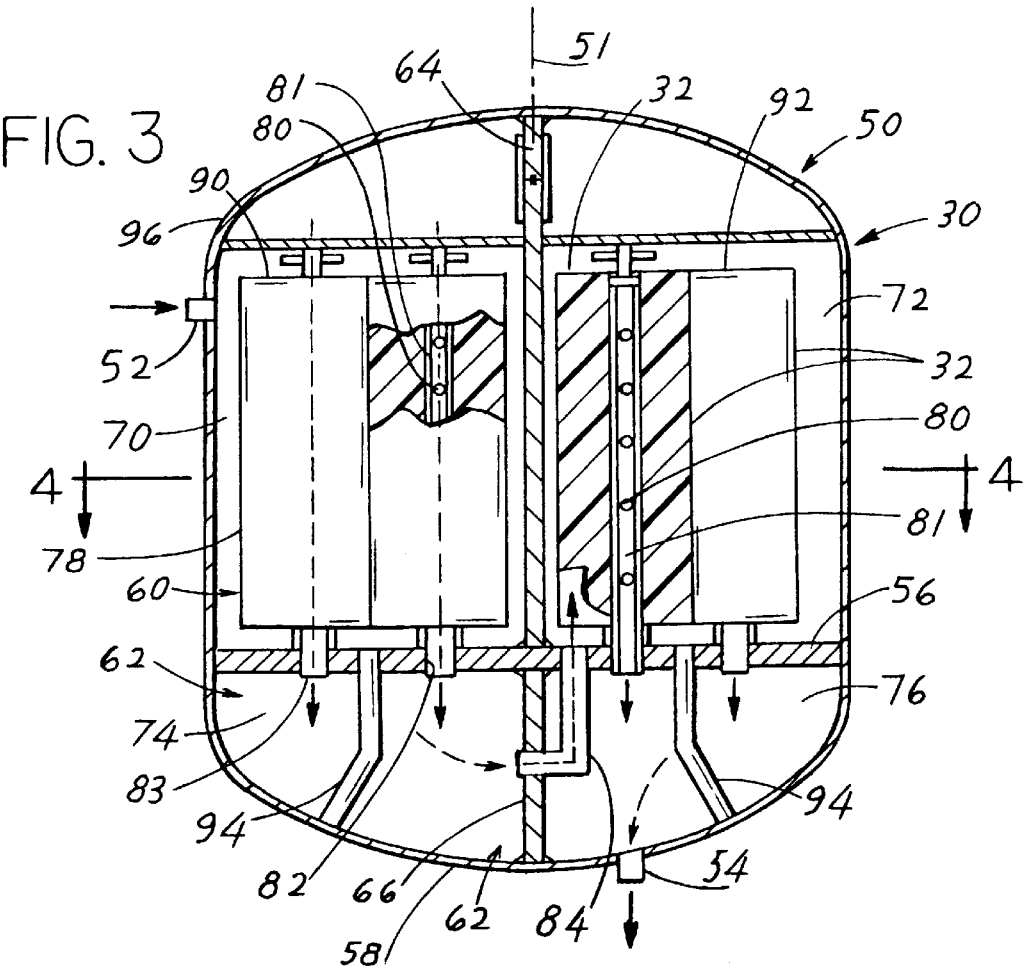
FIG. 3 is a sectional view of the pressure vessel of the apparatus of FIG. 1.
Figure 4:
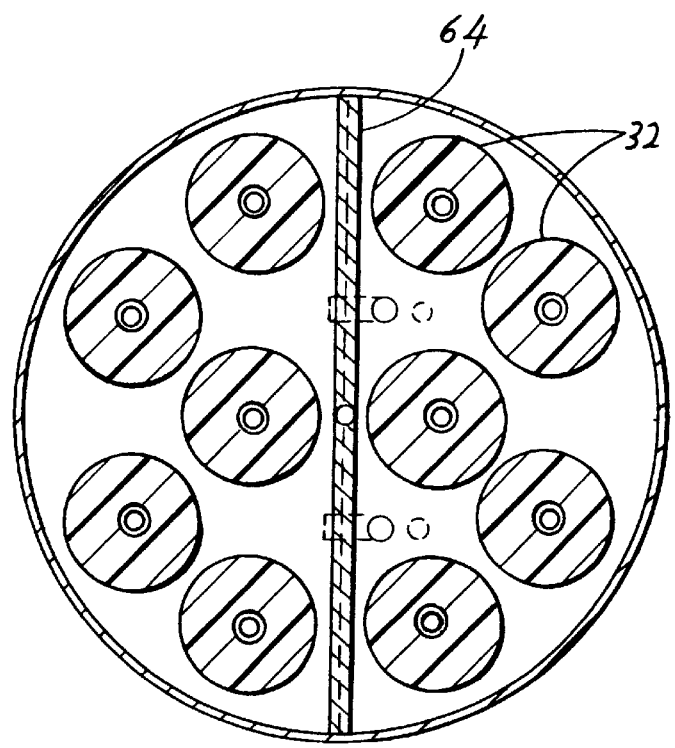
FIG. 4 is a view taken on line 4—4 of FIG. 3.

Cleaning of the dirty oil is accomplished by pumping it through the filter tank 30, which contains disposable filters that trap contaminants, including particles and "gummy" constituents. FIG. 3 shows details of the filter tank 30, with the filters 32 therein. The filter tank includes a pressure vessel 50 that is designed to withstand a moderately high pressure such as 100 psi. The axis 51 of the vessel is preferably vertical, but can be tilted or even horizontal. The vessel has an inlet port or inlet 52 and an outlet port or outlet 54. A horizontal plate-like manifold member 56 lying above the bottom wall 58, divides most of the area within the pressure vessel into a filter region 60 that lies above the manifold member, and a manifold region 62 which lies below the manifold member. In addition, two plate-like dividers 64, 66 that lie in primarily vertical planes, are used to divide each region into two parts. That is, the filter region 60 is divided into first and second filter region parts 70, 72, while the manifold region 62 is divided into first and second manifold region parts 74, 76.

Oil to be cleaned is pumped into the inlet 52, and builds up a pressure within the first filter region part 70. The pressure forces the oil through filter input areas 78 found at their outside (especially their top and bottom) and through and between layers of filter paper to the center of the filter, and through holes 80 in a tube 81. The tube extends through a hole 82 in the manifold member 56, so oil that has passed through the filter material and that is partially clean, passes through the tube lower ends 83 and enters the first manifold region part 74. Oil in the first manifold region part 74 builds up in pressure and exits the first manifold region part through a series conduit 84 to enter the second filter region part 72. Oil in the second filter region part passes through layers of filter paper of the filters 32, to the center of the filters, where they pass through holes 80 in tubes 81 that carry the oil down to the second manifold region part 76. The outlet 54 is connected to the second manifold region part 76. This arrangement assures that any oil that has passed through the filter tank 30 has passed through two filters 32, one in one group 90 and one in another group 92, that are connected in series. As a result, if one of the disposable filters 32 is damaged, so oil can rapidly pass through it without being cleaned, this will not result in dirty oil finding its way to the outlet 54.

It would be possible to place the two groups of filters 90, 92 in separate pressure vessels. However, pressure vessels become more efficient in minimizing the amount of space they occupy and their weight and cost, by using a single pressure vessel where two otherwise would be used. This advantage occurs only when the pressure vessels are of moderate size, since a very large pressure vessel is very difficult to move. Applicant minimizes the space and cost for the pressure vessel by combining both groups of filters 90, 92 in the same pressure vessel. However, the groups must be separated because there is a difference in the pressure of oil in the first and second filter region parts 70, 72. For example, the pressure of oil in the first filter part 70 may be 60 psi with a pressure drop through the first filter of 20 psi, so the pressure of oil in the second filter region part 72 is only 40 psi. The divider 64 withstands such pressure difference, while the walls of the pressure vessel 50 withstand the maximum pressure. Similarly, pressures in the first and second manifold region parts 74, 76 are unequal, as where the pressure in the first part 74 is 40 psi and the pressure is the second part 76 is 20 psi. The manifold divider 66 withstands such pressure difference, while the highest pressure is withstood by the walls of the pressure vessel.

The placement of the two groups of filters 90, 92 in the same pressure vessel, enables the connections through the series conduit 84 to be placed so any slight leakage does not spoil the environment and so the series conduit 84 is very short. The manifold member 56 and manifold divider 66 can be simple plates that are welded within the pressure vessel, as can be the filter region divider 64. It is noted that drain pipes 94 are provided, and that the pressure vessel includes a removable top 96 for filter replacement, as described in my earlier U.S. Pat. No. 5,611,924.

Figure 2:
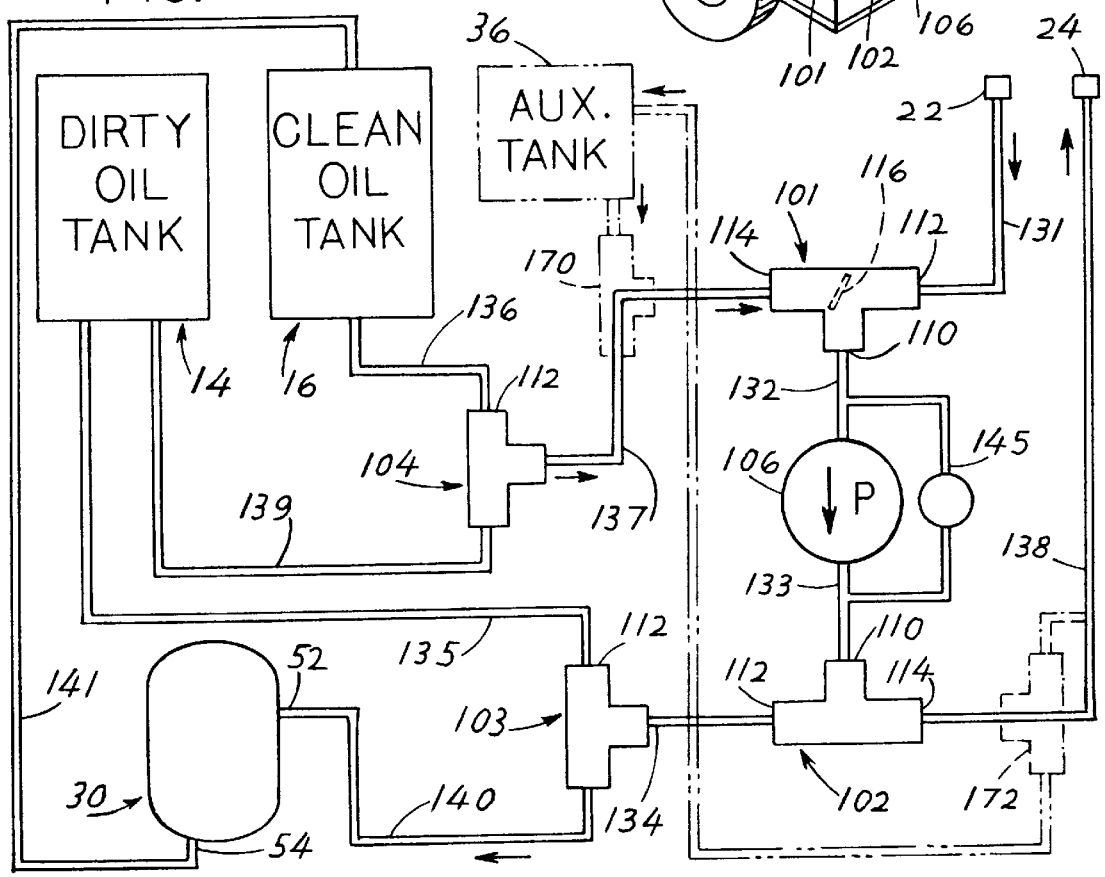
FIG. 2 is a schematic diagram of the parts of the apparatus of FIG. 1.

FIG. 2 shows groups of valves and a pump for controlling the flow of oil in operation of the system. Where the auxiliary tank 36 is not used, the system includes four two-way valves 101, 102, 103 and 104, and one pump 106. Each valve such as the first one 101 has a main end 110 and first and second secondary ends 112, 114. A valve member 116 can be switched to allow flow between the main end 110 and a selected one of the two secondary ends 112, 114. Initially, all valves can be set to connect the main end 110 with the secondary end 112. Dirty hydraulic fluid passes from a vehicle reservoir through the inlet 22, through a first conduit 131, through the valve ends 112, 110, and through a second conduit 132 to the pump 106. The pump pumps the fluid through a third conduit 133, and through the second valve 102 between its main end 110 and its first secondary end 112. The oil flows through a fourth conduit 134 and through the third valve 103, between its main end and first secondary end 112, and through a fifth conduit 135 to the dirty oil tank 14. As discussed above, such pumping continues until all of the dirty oil in the vehicle reservoir has been pumped out to the tank 14. A pump recirculation device 145 avoids pump damage.

In a next step, the first and second valves 101, 102 are switched to the second state. Oil then flows from the clean oil tank 16 through a sixth conduit 136, through the first secondary end 112 of the fourth valve 104 and through a seventh conduit 137 to the first valve 101. Oil flows through the first valve and through the pump 106 to the second valve 102, and flows from it through an eighth conduit 138 to the output 24 to pump clean oil into the vehicle reservoir until it is refilled.

In a next step for initially cleaning the oil, the second, third, and fourth valves are switched and the pump is operated, so dirty oil from the dirty oil tank 14 flows through a ninth conduit 139, through the fourth valve 104, through the first valve 101, through the pump 106, through the second valve 102, and through the third valve 103 and a tenth conduit 140 to the filter tank 30. The oil flows through the filter tank and through an eleventh conduit 141 to the clean oil tank 16. This passage of oil from the dirty oil tank to the clean oil tank results in filtering out most of the contaminants of the oil. For example, the dirty oil from an airplane hydraulic oil reservoir commonly contains about one-half million particles of a size of five to ten microns, per one hundred ml. (milliliters). After passing once through the filter tank 30, the contaminants may be reduced to 50,000 of such particles per 100 ml. However, many specifications require no more than 16,000 of such particles per one hundred milliliters before its use in an airplane hydraulic system. Depending on the viscosity of the oil, it may require perhaps twenty minutes to pass 60 gallons of dirty oil from the dirty oil tank 14 through the filter tank 30 to the clean oil tank 16.

After a single pass of the dirty oil through the filter tank 30, the oil is further filtered, which is often referred to as "polishing" the oil. This is accomplished by continually pumping the oil (which has passed once from the dirty oil tank through the filter tank 30) repeatedly or continually through the filter tank 30 and back to the clean oil tank 16. This is accomplished by switching the valves so during operation of the pump, oil passes from the clean oil tank 16 through the fourth and first valves 104, 101 through the pump 106, through the second and third valves 102, 103, and through the filter tank 30 back to the clean oil tank 16. Such continuous pumping of oil from the clean tank through the filtered tank and back to the clean tank gradually reduces the number of particles in the oil. After one hour of such continuous polishing of the oil, the number of particles of five to fifteen microns per 100 ml. may be reduced from 50,000 to 16,000, making the oil fit for pumping into an airplane hydraulic oil reservoir. If there is less than 65 gallons of oil to be processed, then less time is required to initially clean and to polish.

Although a level of 16,000 particles of five to ten microns per one hundred milliliters is the maximum allowed under many standards, it is usually desirable to provide oil that is much cleaner. If the oil in the clean oil reservoir is not immediately required for an airplane, applicant continues to pass it through the filter tank to keep polishing the oil to further reduce the number of particles. After four hours, the 5 to 15 micron particles may be reduced to 4000 per 100 ml. Thus, if there is a considerable period between requirements for changing oil of a large airplane oil reservoir, applicant can supply oil much cleaner than required by minimum standards, which prolongs the life of the hydraulic equipment of the airplane.

Figure 5:
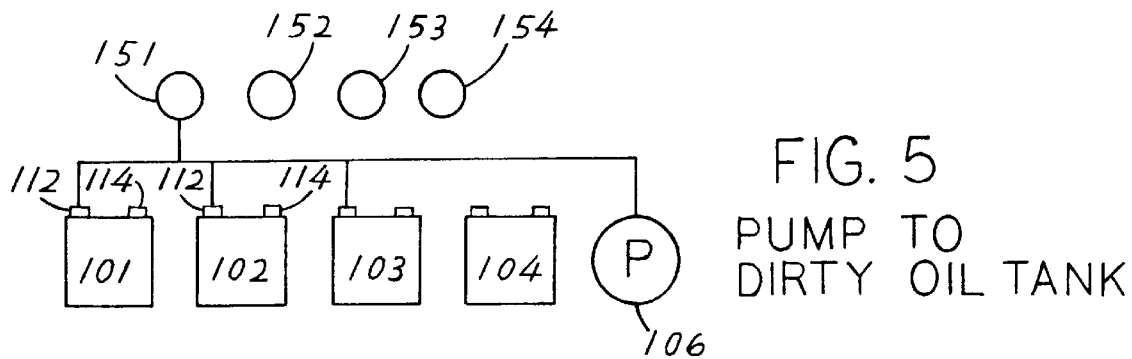
FIG. 5 is a schematic view showing the state of the valves during a first step, when dirty oil is pumped from the vehicle reservoir into the dirty oil tank of the apparatus.

FIG. 1 shows a control panel 150 with four buttons 151–154 with one depressed at a time to control the valves. FIGS. 5–8 show how each button controls the valves. Although it is possible to provide a circuit for automatic sequencing, applicant prefers to require a manual operation of a control for each sequence, so the operator is encouraged to check the positions of the hoses and other parts prior to advancing to each new step. In FIG. 5, the first button 151 is depressed to switch the valves 101–103 so they are in the first position wherein the main end of each valve is connected to the first secondary end 112 of each valve. Also, the pump 106 is energized to begin pumping oil. This arrangement pumps dirty vehicle reservoir oil into the dirty oil tank.

Figure 6:
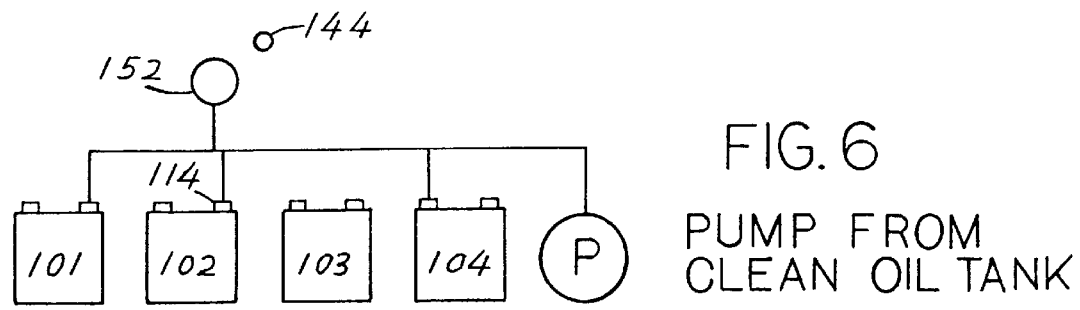
FIG. 6 is a view similar to that of FIG. 5, shown during a second step, when clean oil from the clean oil tank of the apparatus is pumped into the vehicle oil reservoir.
Figure 7:
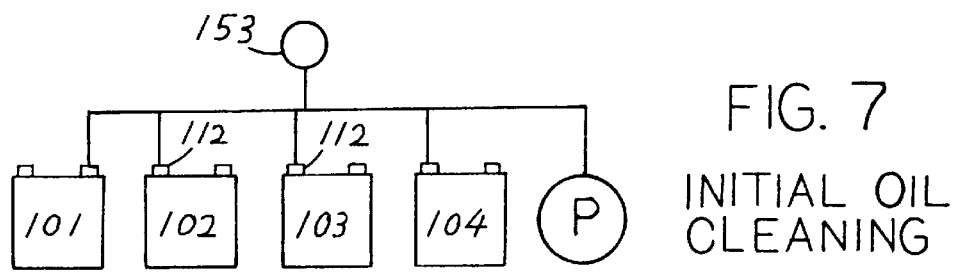
FIG. 7 is a view similar to that of FIG. 6, but showing a third step when oil is pumped from the dirty oil tank to the clean oil tank for an initial cleaning.
Figure 8:
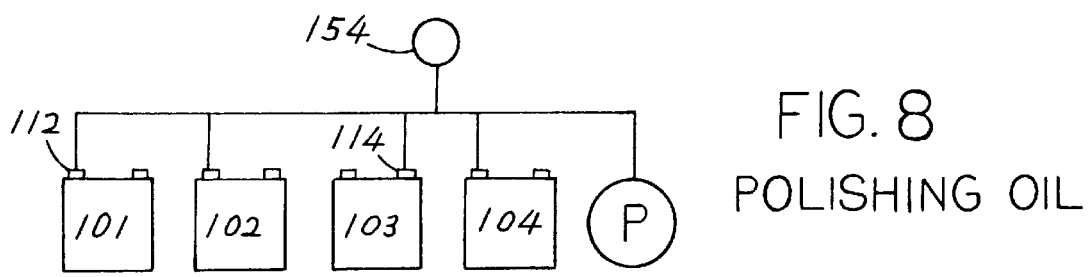
FIG. 8 is a view similar to that of FIG. 7, but showing a fourth step, when oil is repeatedly pumped from the clean oil tank, through the vessel and back to the clean oil tank, for oil polishing.

In FIG. 6, the first and second valves 101, 102 have been switched to the second position while the fourth valve has been established in its first position. This pumps clean oil into the vehicle reservoir. A warning light 144 reminds the operator that the output hose must be connected to the vehicle reservoir, and the button 152 must be pressed again to begin pump operation. In FIG. 7, the second and third valves 102, 103 have been switched to pump oil from the dirty oil tank to the clean oil tank. In FIG. 8, the first and third valves 101, 103 have been switched to continually pump oil from the clean oil tank and through the filter tank back to the clean oil tank.

Each of the valves is of a well known type that includes a solenoid that moves the valve member 116 between two positions to connect the main end to a selected one of the two secondary ends. When a switch such as 151 is depressed, it passes current to the solenoids of all of the corresponding valves to switch them (or keep them in the same position).

Where the auxiliary tank 36 of FIG. 2 is used, two additional valves 170, 172 are provided. Valve 170 is connected in series with conduit 137, while valve 172 is connected in series with conduit 138. The valves 170, 172 allow clean oil to be transferred from the clean oil tank 16 to the auxiliary tank, and allow clean oil to be transferred from the auxiliary tank through the system outlet 24 to an airplane oil reservoir. If desired, an additional valve can be provided to transfer oil from the auxiliary tank to the clean oil tank.

In one example of apparatus for a military airport where the largest airplane has a 65 gallon reservoir, each of the tanks 14, 16, 36 has a 70 gallon capacity. Initially the first tank 14 is empty, the second tank 16 contains 65 gallons of clean oil, and the auxiliary tank contains 30 gallons of clean oil. If a large airplane first must be serviced, the tank 14 is filled with dirty oil while the tank 16 is emptied. Thereafter, and after an additional perhaps 30 minutes, half of the dirty oil has been pumped from the tank 14 through the filter tank 30 to the tank 16. At that time a second airplane with an oil reservoir of up to 30 gallons can be serviced, by pumping its dirty oil into the dirty oil tank 14 (or directly through the filter tank 30 to tank 16, but with no more oil pumped out of tank 14). Clean oil is supplied from the auxiliary tank 36.

In another example, three airplanes, each with a 10 gallon reservoir, are first to be serviced. The dirty oil from each is dumped into the tank 14 and clean oil is drawn from tank 16. Only when 30 gallons has accumulated in tank 14, does cleaning begin. First, tank 16 is emptied by pumping its clean oil into auxiliary tank 36. Then the 30 gallons of dirty oil is pumped from tank 14 through the filter tank to tank 16 for initial cleaning, followed by polishing. Additional airplanes can be serviced while the dirty oil is being initially cleaned and then polished.

Energy for driving the pump (and possibly for switching the valves) can be obtained from an energy source (e.g. engine-generator set) on the frame or through a long electrical cord.

Thus, the invention provides an apparatus and method for efficiently changing oil in a vehicle oil reservoir and for cleaning it, often without waiting for the movement of the apparatus (as from a temporary parked location to a central processing station) and always without waiting for the pumping of oil into and out of separate processing equipment. Dirty and clean oil tanks are mounted on a frame, together with a filter tank and pump and valve means. This not only enables removal of oil from a vehicle reservoir and immediate pumping of clean oil into the reservoir, but the subsequent cleaning of the oil without waiting for external transfers of it. The clean oil tank does "double duty" by storing clean oil to refill an airplane reservoir, and by receiving only initially cleaned oil and holding it during polishing, preferably in combination with an auxiliary tank. The filter tank includes a pressure vessel with a filter region divided into two filter region parts that each contains a plurality of filters, so oil is passed in series through the filters. The vessel also includes a manifold region divided into first and second manifold region parts, with the first manifold region part receiving filtered oil from all of the first group of filters and delivering it to the second filter region part, and the second manifold region part collecting oil from the second group of filters.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for the rapid change of oil in vehicle oil reservoirs, comprising:

pumping out dirty oil from a vehicle reservoir and flowing the dirty oil into a dirty oil tank that is located on a frame;

pumping out clean oil from a clean oil tank on said frame, and into said vehicle reservoir to refill it with clean oil;

pumping dirty oil from said dirty oil tank through filters in a filter tank that is located on said frame and from said filter tank into said clean oil tank to fill said clean oil tank with initially cleaned oil and to empty said dirty oil tank;

after pumping oil from said dirty oil tank through said filter tank and into said clean oil tank, continually pumping oil from said clean oil tank through said filters in said filter tank and back to said clean oil tank to polish the oil in said clean oil tank, and thereby ready the oil for pumping into another vehicle oil reservoir;

said frame being supported on wheels for movement of said frame from one vehicle to another;

said steps of pumping oil through filters in said filter tank, are conducted in part while said frame is being moved after having received dirty oil from a vehicle.

2. A method for the rapid change of oil in vehicle oil reservoirs, comprising:

pumping out dirty oil from a vehicle reservoir and flowing the dirty oil into a dirty oil tank that is located on a frame;

pumping out clean oil from a clean oil tank on said frame, and into said vehicle reservoir to refill it with clean oil;

pumping dirty oil from said dirty oil tank through filters in a filter tank that is located on said frame and from said filter tank into said clean oil tank to fill said clean oil tank with initially cleaned oil and to empty said dirty oil tank;

after pumping oil from said dirty oil tank through said filter tank and into said clean oil tank, continually pumping oil from said clean oil tank through said filters in said filter tank and back to said clean oil tank to polish the oil in said clean oil tank, and thereby ready the oil for pumping into another vehicle oil reservoir;

after said step of pumping out clean oil from said clean oil tank into said vehicle reservoir, pumping any remaining oil in said clean oil tank into an auxiliary tank prior to pumping dirty oil from said dirty oil tank through said filter tank into said clean oil tank.

\* \* \* \* \*